(12) United States Patent
Miyajima et al.

(10) Patent No.: US 6,850,349 B2
(45) Date of Patent: Feb. 1, 2005

(54) VIBRATOR AND MANUFACTURING METHOD THEREOF

(75) Inventors: Hiroshi Miyajima, Hachioji (JP);
 Masanori Ogata, Matsumoto (JP);
 Yukihiro Aoki, Okaya (JP); Yoshiro Nishimura, Okaya (JP)

(73) Assignee: Olympus Corporation, Tokyo (JP)

( * ) Notice: Subject to any disclaimer, the term of this patent is extended or adjusted under 35 U.S.C. 154(b) by 194 days.

(21) Appl. No.: 10/123,782

(22) Filed: Apr. 16, 2002

(65) Prior Publication Data

US 2002/0154374 A1 Oct. 24, 2002

(30) Foreign Application Priority Data

Apr. 20, 2001 (JP) ........................................ 2001-123156

(51) Int. Cl.[7] ............................................. G02B 26/08
(52) U.S. Cl. ...................................... 359/199; 359/224
(58) Field of Search ............................... 359/223, 199, 359/212, 213, 214, 224

(56) References Cited

U.S. PATENT DOCUMENTS

| 3,532,408 A | 10/1970 | Dostal |
| 5,557,444 A | 9/1996 | Melville et al. |
| 6,046,866 A | 4/2000 | Ikegame |
| 6,061,323 A | 5/2000 | Jerman et al. |
| 6,122,089 A | 9/2000 | Minamoto et al. |

FOREIGN PATENT DOCUMENTS

| EP | 0 712 121 A2 | 5/1996 |
| JP | 9-197334 | 7/1997 |

*Primary Examiner*—Euncha P. Cherry
(74) *Attorney, Agent, or Firm*—Scully, Scott Murphy & Presser

(57) ABSTRACT

A vibrator comprises a vibrating member and a fixing member. The vibrating member has a pair of support members, a movable plate capable of vibrating with respect to the support members, and a pair of elastic members connecting the support members to the movable plate. The fixing member holds the support members of the vibrating member. A material mainly constituting the fixing member has a larger coefficient of thermal expansion than that of a material mainly constituting the elastic members of the vibrating member.

8 Claims, 6 Drawing Sheets

VIBRATOR AND MANUFACTURING METHOD THEREOF

CROSS-REFERENCE TO RELATED APPLICATIONS

This application is based upon and claims the benefit of priority from the prior Japanese Patent Application No. 2001-123156, filed Apr. 20, 2001, the entire contents of which are incorporated herein by reference.

BACKGROUND OF THE INVENTION

1. Field of the Invention

The present invention relates to a vibrator, which is used in an optical deflector, an acceleration sensor, an angular velocity sensor, or the like, the vibrator including a movable plate, which is supported from both sides. The present invention also relates to a manufacturing method for manufacturing such a vibrator.

2. Description of the Related Art

The idea of manufacturing optical deflectors by silicon micro-machining is reported by K. Petersen in 1980. In recent years, not only optical deflectors but also acceleration sensors and angular velocity sensors are being developed by use of the same technology. These types of apparatus use a vibrator that comprises a movable plate supported by an elastic member and being capable of vibrating. When applied to an optical deflector, the movable plate is provided with a reflecting plate. To provide a great amplitude of vibration based on a small amount of power, it is desirable that the movable plate be vibrated by utilization of resonance. When applied to an acceleration sensor or an angular velocity sensor, the movable plate is used as a detecting member for detecting the acceleration or angular velocity.

In principle, in this type of vibrator, the resonance frequency is determined by the stiffness of the elastic member and the inertial property of the movable plate. To actuate the vibrator by utilization of resonance, a driving signal having the same frequency as the resonance frequency is applied, but the actual resonance frequency varies due to various factors. One of the major factors is the temperature, and the stiffness of the elastic member varies in accordance with a change in the temperature (in general, the stiffness decreases in accordance with an increase in the temperature), resulting in a change in the resonance frequency.

There are some vibrators that must be driven on a constant frequency, and the resonance frequency of such vibrators must be kept constant. This requirement arises depending upon the purposes for which the vibrators are used. To satisfy this requirement, several techniques for realizing a constant resonance frequency of a vibrator have been proposed to date Jpn. Pat. Appln. KOKAI Publication No. 9-197334 discloses a vibrator wherein an elastic member is provided with a resistance heating type of heater and the temperature of that elastic member is controlled. In this vibrator, the heater is so controlled as to keep the temperature of the elastic member constant despite changes in the environmental temperature, and the resonance frequency is stabilized thereby.

Due to the additional use of the heater, the manufacturing cost of the vibrator of Jpn. Pat. Appln. KOKAI Publication No. 9-197334 is high. In addition, since the heater is continuously supplied with current, the power consumption inevitably increases. Furthermore, since the temperature of the elastic member is controlled based on the heat generated by the heater, effective measures cannot be taken to cope with an increase in the environmental temperature.

U.S. Pat. No. 5,557,444 discloses a vibrator provided with a temperature-compensating rod. The temperature-compensating rod is independent of the vibrator and cancels the temperature-dependent stiffness change of the elastic member by utilization of the difference in thermal expansion coefficients. To be more specific, the temperature-compensating rod changes its length in accordance with a temperature in the environmental temperature, thereby providing the elastic member with stress that serves to cancel the stiffness variation of the elastic member. Hence, the resonance frequency is stabilized.

Due to the additional use of the temperature compensating rod, the manufacturing cost of the vibrator of U.S. Pat. No. 5,557,444 is inevitably high. According to this U.S. patent, the change in the length of the temperature compensating rod stresses the base member that holds the vibrator, and the deformation of the stressed base member stresses the elastic member of the vibrator. In general, the base member is thought to be very rigid, and it is questionable whether the elastic member of the U.S. patent produces a desired stress.

BRIEF SUMMARY OF THE INVENTION

An object of the present invention is to provide a vibrator whose resonance frequency hardly varies despite changes in the environmental temperature. Another object of the present invention is to provide a manufacturing method of the vibrator.

As one aspect, the present invention provides a vibrator comprising: a vibrating member including a pair of support members, a movable plate capable of vibrating with respect to the support members, and a pair of elastic members connecting the support members and the movable plate; and a fixing member holding the support members of the vibrating member, the fixing member being mainly constituted by a material that has a larger coefficient of thermal expansion than that of a material mainly constituting the elastic members of the vibrating member. For example, the fixing member is mainly formed of a metallic material, and the elastic members are mainly formed of silicon or its compound.

As another aspect, the present invention provides a vibrator-manufacturing method comprising: forming a vibrating member by use mainly of a first material, the vibrating member integrally including a frame-like support member, a vibrating member capable of vibrating with respect to the support member, and a pair of elastic members connecting the support and vibrating members together; forming a fixing member by use mainly of a second material, the second material having a larger coefficient of thermal expansion than that of the first material; fixing the support member of the vibrating member to the fixing member at room temperature; and dividing the frame-like support member into two pieces.

According to the present invention, since the vibrating member is fixed to the fixing member, which is mainly constituted by a material having a larger coefficient of thermal expansion than that of a material mainly constituting the elastic members of the vibrating member, a variation in the resonance frequency of the vibrating member caused by a change in the environmental temperature is suppressed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
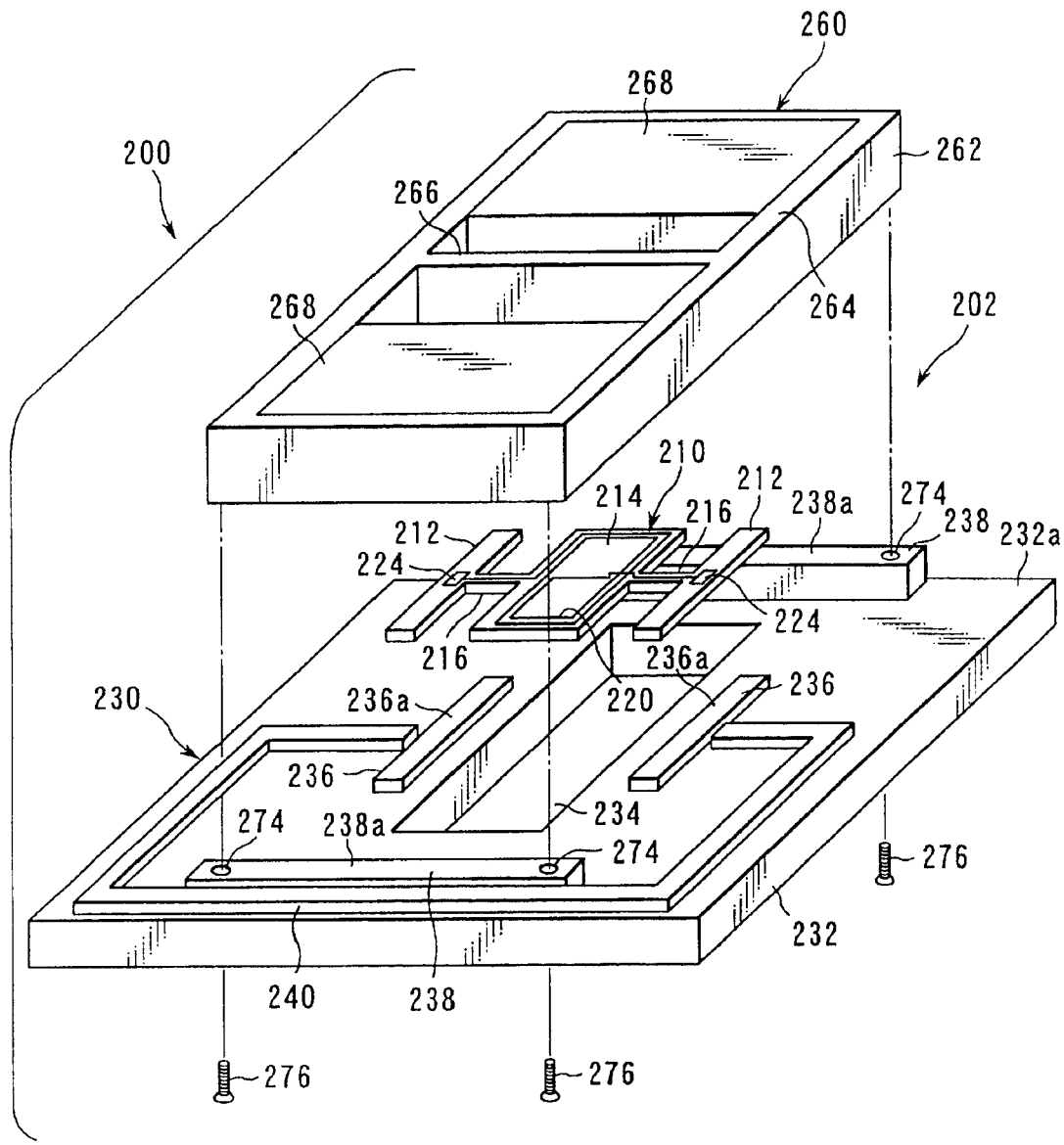
FIG. 1 is an exploded perspective view showing an optical deflector according to one embodiment of the present invention.

An embodiment of the present invention will be described, referring to the drawings. The embodiment is directed to an optical deflector incorporating a vibrator.

As shown in FIG. 1, the optical deflector 200 according to the present embodiment comprises a vibrator 202 including a mirror chip 210 as a vibrating member and a base 230 as a fixing member. The optical deflector 200 also comprises a magnetic circuit 260 for driving the mirror chip 210.

Figure 2:
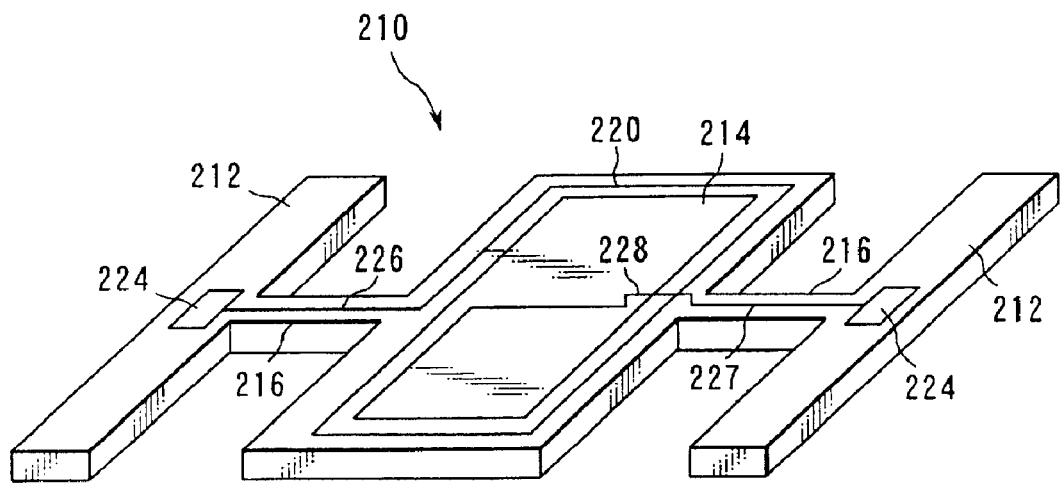
FIG. 2 is a perspective view showing the mirror chip depicted in FIG. 1 in an enlarged scale.

As shown in detail in FIG. 2, the mirror chip 210 comprises a pair of support members 212; a movable plate 214 capable of vibrating with respect to the support members 212; and a pair of elastic members 216 connecting the movable plate 214 to the support members 212. The movable plate 214 is able to vibrate about the elastic members 216 as an axis with respect to the support member 212, with the elastic members 216 being repeatedly twisted. In other words, the movable plate 214 is supported by the elastic members 216, which allows the movable plate 214 to rotate with respect to the support member 212.

The mirror chip 210 has obverse and reverse surfaces, namely, the first surface that is depicted in FIG. 2, and the second surface that is not depicted in FIG. 2. The movable plate 214 is provided with a conductive element 220 formed on the first surface. The conductive element 220 is, for example, a coil extending along the periphery of the movable plate 214, but is not limited to this. The movable plate 214 has a specular surface 218 formed on the second surface (refer to FIGS. 10 and 11).

The support members 212 have electrode pads 224, respectively. One of the electrode pads 224, the left side one, is electrically connected to the outer end of the coil 220 through a wiring line 226 extending along one of the elastic members 216, the left side one. The other of the electrode pads 224, the right side one, is electrically connected to the inner end of the coil 220 through a wiring line 227 extending along the other elastic member 216, the right side one, and a bridge wiring line 228 bridging the coil 220 extending along the periphery of the movable plate 214.

The mirror chip 210 is, for example, made from a monocrystalline silicon wafer, using the semiconductor manufacturing technology. Therefore, the support members 212, the movable plate 214 and the elastic members 216 are mainly made of monocrystalline silicon. In other words, the stiffness of these members mainly depends on the stiffness of monocrystalline silicon.

The mirror chip 210 is not limited to the example described above. For example, different kinds of materials, including polycrystalline silicon, a silicon compound and an organic material, may be used in combination, in addition to the monocrystalline silicon wafer. In addition, another kind of technology may be used in place of the semiconductor manufacturing technology.

As shown in FIG. 1, the base 230 includes: a main board 232 formed of a metallic material, such as stainless steel; a pair of adhesive sections 236 to which the support members 212 of the mirror chip 210 are attached; a pair of attachment portions 238 to which the magnetic circuit 260 is coupled; and a rigid board 240 fixed to the main board 232. The stiffness of the base 230 mainly depends on the stiffness of the main board 232. That is, the base 230 is mainly made of a metallic material.

The main board 232 has an opening 234, which exposes the specular surface 128 formed on the movable plate 214 of the mirror chip 210. The main board 232 has a flat surface 232a facing the second surface of the mirror chip 210. The adhesive sections 236 are projected from the flat surface 232a and have flat adhesive surfaces, which are substantially parallel to the flat surface 232a. Likewise, the attachment portions 238 are projected from the flat surface 232a and have attachment surfaces 238a, which are substantially parallel to the flat surface 232a. The adhesive sections 236 and the attachment sections 238 are integrally formed with the main board 232 as one body, for example, but they may be formed independently and fixed to the main board 232 by use of an adhesive.

The rigid board 240 comprises a wiring board having wiring used for external connection. The wiring board 240 is long and extends in the shape of "U". The ends of the rigid board 240 are located close to the adhesive sections 236.

Figure 3:
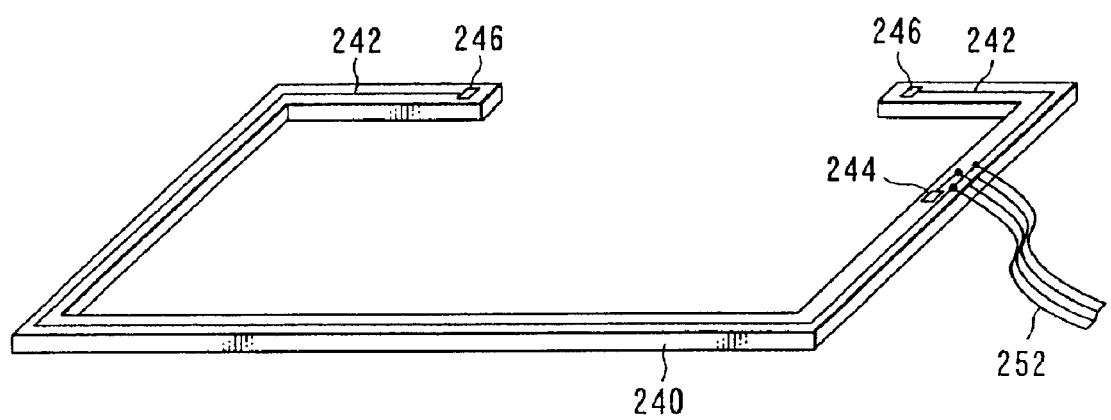
FIG. 3 is a perspective view showing the wiring board depicted in FIG. 1 in an enlarged scale, lead wires being connected to the wiring board.

As shown in FIG. 3, the wiring board 240 includes a pair of wiring lines 242 used for electrical connection to the electrode pads 224, and a grounding line (GND) 244 used for grounding. The wiring lines 242 extend along the wiring board 240 and are electrically connected to bonding pads 246, which are located at the respective ends.

The GND line 244 is connected to a GND pad provided on the obverse side of the wiring board 240.

The GND pad is connected to another GND pad provided on the reverse side of the wiring board 240 via a through hole. The main board 232 is conductive, and the wiring board 240 is fixed to the main board 232 by use of a conductive adhesive. In this manner, the GND pad on the reverse side of the wiring board 240 is electrically connected to the main board 232.

As shown in FIG. 3, the wiring and GND lines 242 and 244 are electrically connected to a flexible lead line 252 by soldering, for the purpose of electrical connection to an external apparatus, such as a driving control circuit. In other words, the base 230 is provided with a flexible lead line 252 connected to the lines 242 and 244 of the wiring board 240. Through the lead line 252, the wiring board 240 is connected to an external apparatus, such as the driving control circuit of an optical deflector. The use of the lead line 252 is desirable where the optical deflector and the external apparatus are away from each other by a comparatively long distance. Since the length of the lead line 252 can be arbitrarily determined, the optical deflector and the external apparatus can be laid out with a high degree of freedom.

Figure 4:
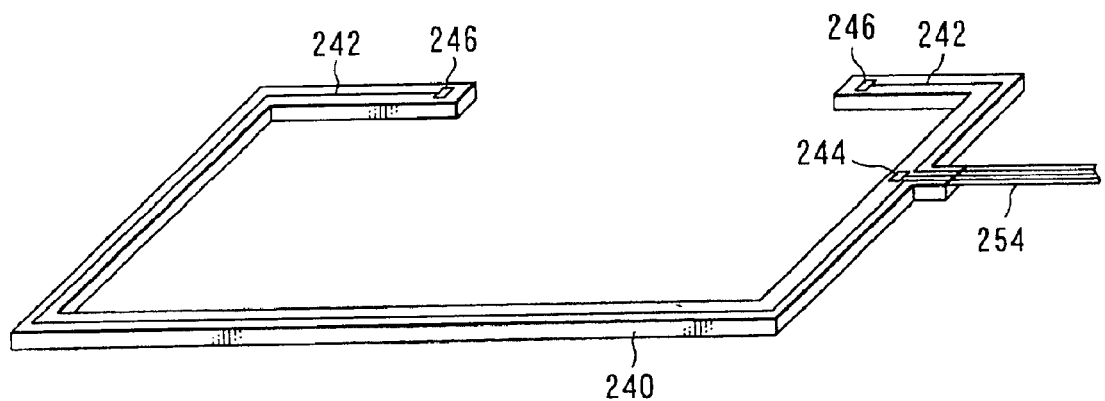
FIG. 4 is a perspective view showing the wiring board depicted in FIG. 1 in an enlarged scale, flexible printed circuit(FPC) board being connected to the wiring board.

The electrical connection to the external apparatus is not limited to the manner described above. For example, the lines 242 and 244 of the wiring board 240 may be electrically connected to a flexible printed circuit(FPC) board 254 integrally formed with the wiring board 240, as shown in FIG. 4. In other words, the base 230 may be provided with a flexible printed circuit(FPC) board 254 integrally formed with the wiring board 240. The wiring board 240 is connected to the external apparatus through the flexible printed circuit(FPC) board 254. The use of the flexible printed circuit(FPC) board 254 is desirable where the optical deflector and the external apparatus are comparatively close to each other. Unlike the case where the lead line is used, the use of the flexible printed circuit(FPC) board 254 is advantageous in that it does not require a connecting operation, such as soldering.

Figure 5:
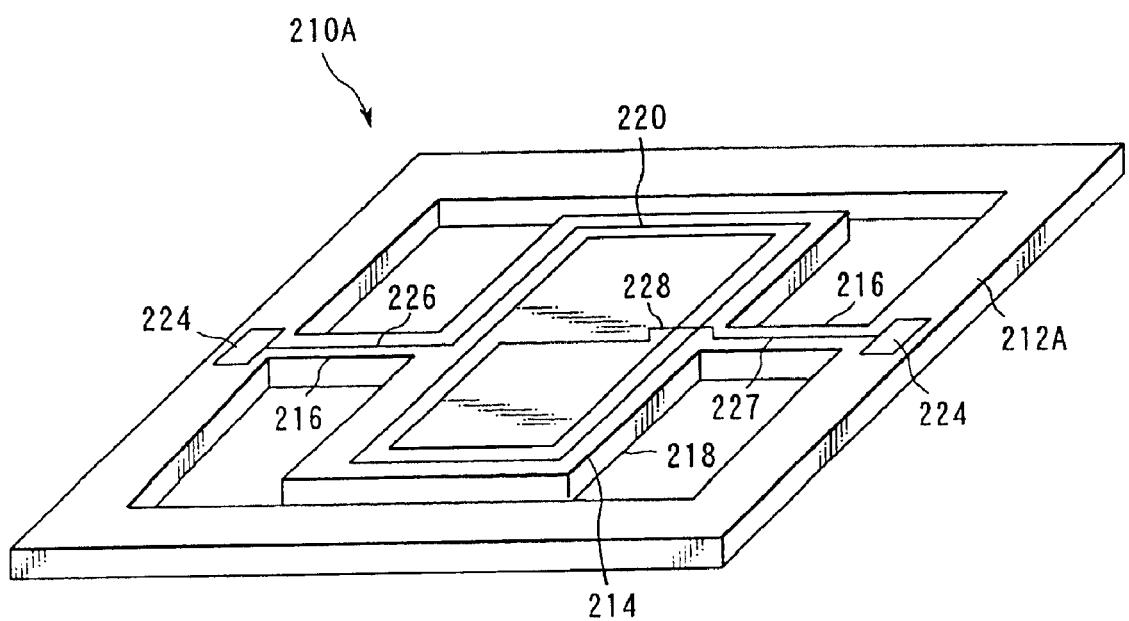
FIG. 5 is a perspective view showing the unassembled state of a mirror chip.
Figure 6:
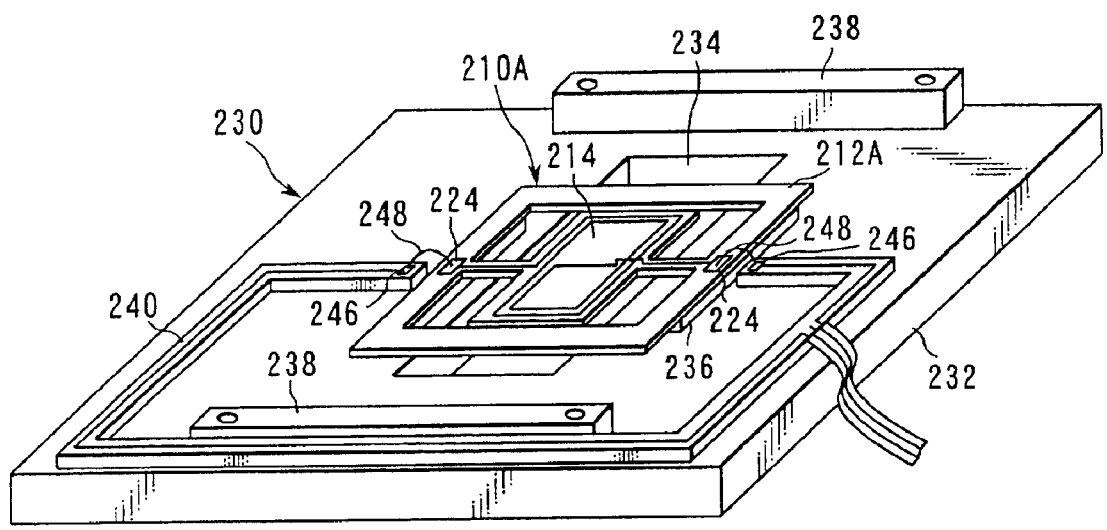
FIG. 6 is a perspective view of a base on which the unassembled mirror chip shown in FIG. 5 is mounted.

The unassembled state of a mirror chip 210A is shown in FIG. 5. The mirror chip 210A in the unassembled state includes a frame-like support member 212A, which surrounds the movable plate 214. As shown in FIG. 6, the unassembled mirror chip 210A is fixed to the base 230 when part of the second surface of the support member 212A is adhered to the adhesive surfaces 236a (FIG. 1) of the adhesive sections 236.

The mirror chip 210A is adhered to the base 230, using an adhesive that cures at room temperature, i.e. a room temperature curing adhesive, which includes a silicone-based adhesive or a 2-liquid epoxy-based adhesive, for example. In adhesion using an adhesive that cures at high temperature, such as a thermosetting adhesive or a UV curing adhesive, thermal stress is caused by the difference between the coefficients of thermal expansion of the base and the mirror chip. The thermal stress changes the resonance frequency, and degrades the flatness of the specular surface. The use of a room temperature curing adhesive serves to prevent from generating the thermal stress. Hence, the change of the resonance frequency before and after the adhesive step, and the degradation of the flatness of the mirror surface are prevented.

Figure 7:
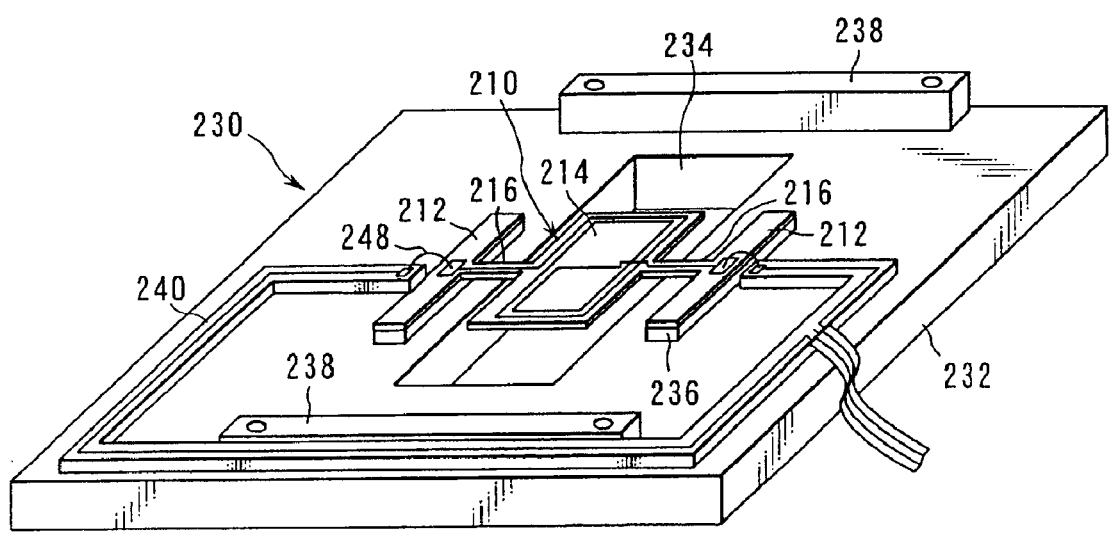
FIG. 7 is a perspective view showing a state where part of support members attached to the base shown in FIG. 6 is removed.

Thereafter, as shown in FIG. 7, a pair of floating portions not attached to the adhesive sections 236, i.e., the portions extending in parallel to the elastic members 216, are removed from the support member 212 of the unassembled mirror chip 210A. As a result, the unassembled mirror chip 210A provided with the frame-like support member is changed into the mirror chip 210 provided with a pair of support members 212. To enable this partial removal of the frame-like support member 212A with ease and stability, grooves are formed in the support member at positions and unnecessary portions are removed along these grooves. The grooves can be formed by half-cut etching or dicing (i.e., the etching or dicing that does not cut the wafer completely).

As shown in FIG. 6, the electrode pads 224 of the mirror chip 210 and the bonding pads 246 of the wiring board 240 are connected together by means of wire bonding. In other words, the electrode pads 224 of the mirror chip 210 and the bonding pads 246 of the wiring board 240 are electrically connected together through bonding wires 248. Although not shown, the bonding wires 248 are preferably sealed in resin to ensure reliability.

The bonding wires are sealed by use of a sealing agent that cures at room temperature, i.e., a room temperature curing sealing. As in the case of the room temperature setting adhesive, the use of the room temperature setting sealing agent serves to prevent from generating the thermal stress. Hence, the change of the resonance frequency before and after the sealing step, and the degradation of the flatness of the mirror surface are prevented.

Figure 8:
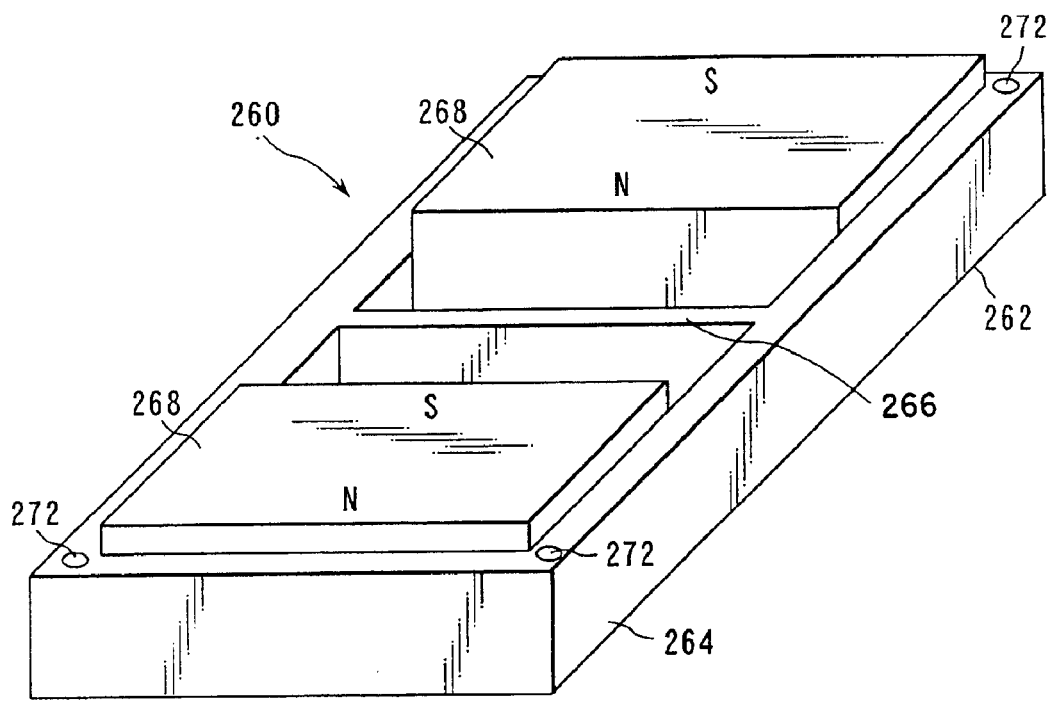
FIG. 8 is a perspective view showing the magnetic circuit depicted in FIG. 1 in an enlarged scale, and illustrates how the magnetic circuit looks like when viewed from the reverse side as viewed in FIG. 1.
Figure 9:
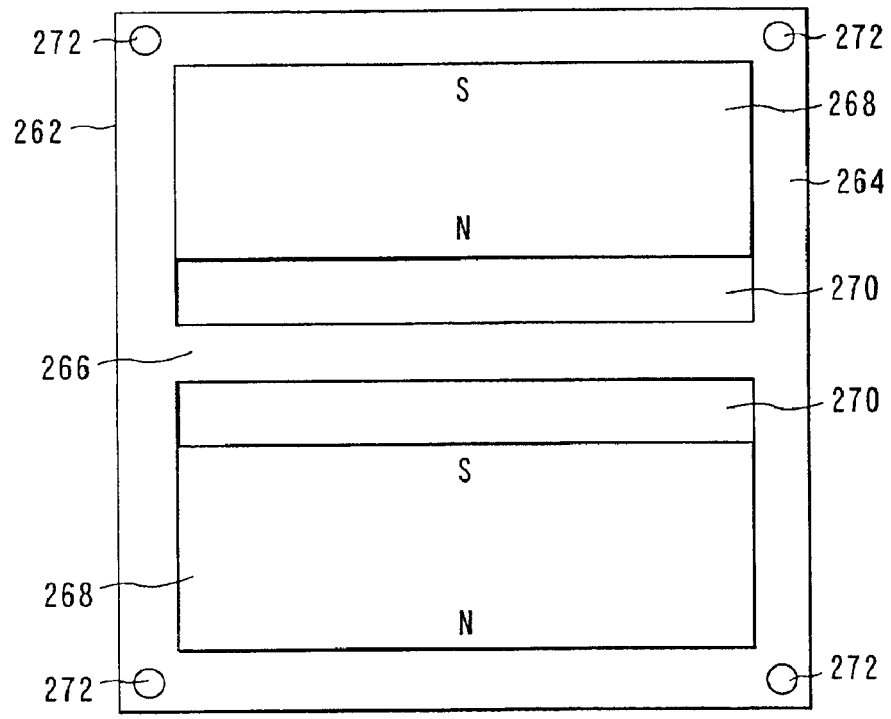
FIG. 9 is a plan view of the magnetic circuit depicted in FIG. 8.

As shown in FIGS. 8 and 9, the magnetic circuit 260 comprises a yoke 262 formed of a magnetic material, and a pair of permanent magnets 268. The yoke 262 includes a frame-like rectangular outer yoke 264 and an inner yoke 266 extending in the center of the inside space of the outer yoke 264. As can be seen from this, the yoke 262 has a pair of rectangular through holes. The yoke 262 of this structure can be formed by partially removing a magnetic rectangular parallelepiped in such a manner as to form two rectangular through holes.

The paired permanent magnets 268 are received in the paired through holes of the yoke 262 and are fixed to and in contact with the outer yoke 264. With this structure, gaps 270 are defined between the permanent magnets 268 and the inner yoke 266. The gaps 270 are referred to as magnetic gaps. In comparison with a magnetic circuit that does not have an inner yoke, the magnetic circuit 260 having the inner yoke 266 is featured in that the magnetic flux density in the magnetic gap 270 is high.

As shown in FIGS. 8 and 9, the yoke 262 of the magnetic circuit 260 has four screw holes in its four corners, respectively. As shown in FIG. 1, the base 230 has four through holes 274 located at attachment positions. The through holes 274 are aligned with the screw holes 272 of the yoke 262.

Figure 11:
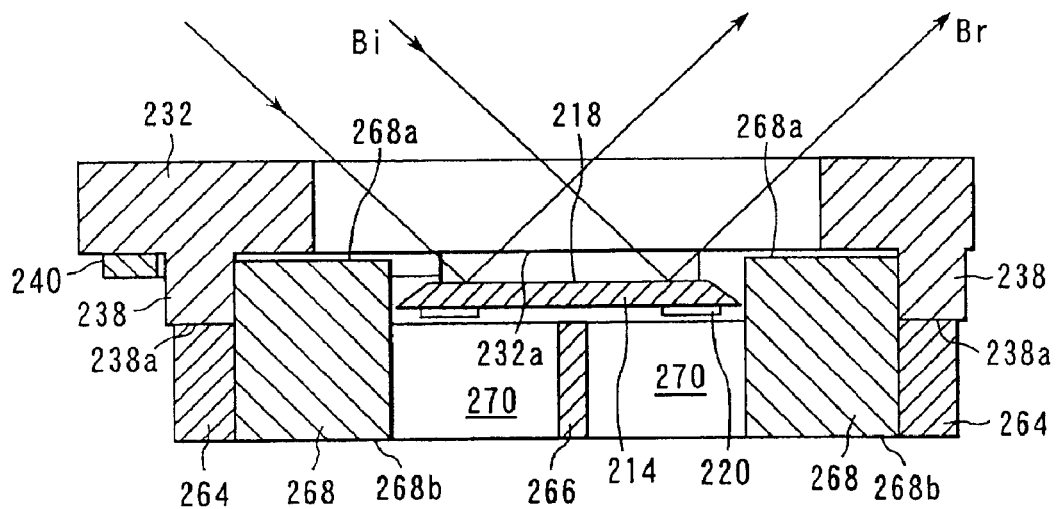
FIG. 11 is a sectional view of the optical deflector taken along line XI—XI of FIG. 10.

As can be seen from FIG. 11, the yoke 262 of the magnetic circuit 260 is in contact with the attachment surfaces 238a of the attachment portions 238. As can be seen from FIG. 1, four screws 276 (only three of which are illustrated) are inserted into the through holes 274 of the base 230 and then into the screw holes 272 of the yoke 262. By tightening the screws 276, the magnetic circuit 260 is fixed to the base 230.

Figure 10:
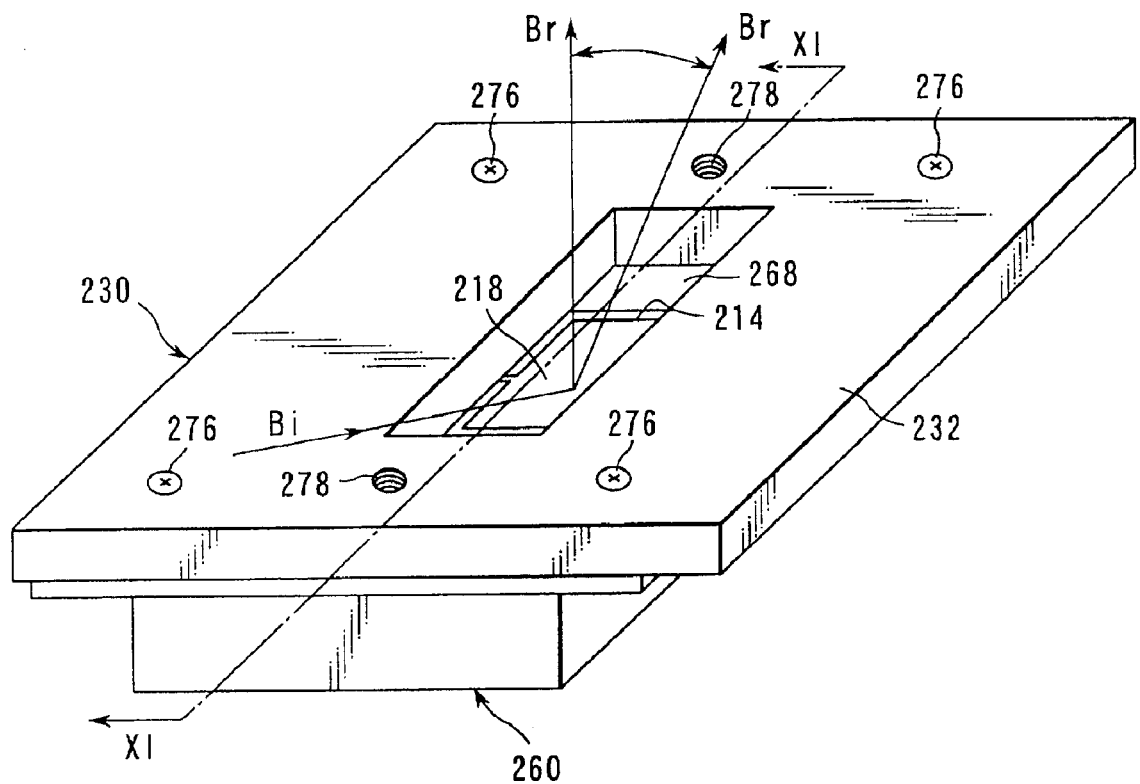
FIG. 10 is a perspective view showing the assembled state of the optical deflector depicted in FIG. 1, and illustrates how the magnetic circuit looks like when viewed from the reverse side as viewed in FIG. 1.

As shown in FIG. 10, the base 230 has a pair of screw holes 278 formed in the main board 232. The screw holes 278 are used for fixing the optical deflector to another apparatus.

The screw holes 272 of the yoke 262, the through holes 274 of the base 230 and the screw holes 278 of the main board 232 are sufficiently away from the adhesion portion between the mirror chip 210 and the base 230 with respect to the direction orthogonal to the longitudinal direction of the elastic members 216 of the mirror chip 210.

As shown in FIG. 11, the inner yoke 266 is located close to the center of the movable plate 214, and is also close to the first surface of the movable plate 214, i.e., the surface on which the coil 220 is provided. Each of the permanent magnets 268 has a surface 268a closest to the main board 232 and a surface 268b farthest therefrom. The coil 220 of the movable plate 214 is located between surfaces 268a and 268b of the permanent magnets 268, as viewed in the direction of the normal of surface 232a of the main board 232.

As a result, the coil 220 is located in the magnetic gaps 270 between the permanent magnets 268 and the inner yoke 266 not only with respect to the direction perpendicular to surface 232a of the main board 232 but also with respect to the direction orthogonal to the axis of the elastic members 216. The position as viewed in the former direction is of particular importance since the magnetic flux density is significantly low outside the magnetic gap 270. In this manner, the coil is arranged in the region where the magnetic flux density is high.

The magnetic circuit 260 fixed to the base 230 and the coil 220 formed on the movable plate 214 constitute driving means for driving the mirror chip 210. The driving means is of electromagnetic driving system. This driving means includes the coil 220 extending along the periphery of the movable plate 214, and the magnetic circuit 260 for applying a magnetic field to the coil 220. The movable plate 214 is driven by utilization of the electromagnetic force acting between the coil 220 and the magnetic circuit 260, and the orientation of the movable plate 214 is properly changed.

The driving means is in no way limited to the electromagnetic driving system described above and may be of another type of system. For example, the driving means may be an electrostatic actuation type. This type of driving means includes a first electrode plate formed on the movable plate and a second electrode plate facing the first electrode plate. Either the first or the second electrode plate includes at least a pair of electrode plates, and the movable plate is driven by utilization of the electrostatic force acting between the first and second electrode plates.

As shown in FIGS. 10 and 11, the specular surface 218 formed on the second surface of the movable plate 214 is exposed in the opening 234 formed in the main board 232 of the base 230. A light beam Bi falls on the specular surface 218 of the movable plate 214 through the opening 234. The light beam Br reflected by the specular surface 218 is directed or deflected, that is, the direction of the reflected light beam Br is changed, in accordance with the direction of the movable plate. The opening 234 has such a size as not to intercept an incident beam Bi falling on the movable plate 214 at an incidence angle of 45°, for example, and a reflected beam Br reflected by the movable plate 214 at a maximal angle of reflection.

In the optical deflector 200 of the present embodiment, the support members 212 of the mirror chip 210 are fixed to the base 230, and the main material of the base 230 has a larger coefficient of thermal expansion than that of the main material of the elastic members 216 of the mirror chip 210. With this structure, a variation in the resonance frequency of the mirror chip 210 is suppressed despite a change in the ambient temperature.

If the mirror chip 210 is looked at alone, its resonance frequency becomes low in accordance with an increase in the ambient temperature because the elastic members 216 expand and the stiffness thereof decreases. On the other hand, the resonance frequency of the mirror chip 210 becomes high in accordance with a decrease in the ambient temperature because the elastic members 216 shrink and the stiffness thereof increases. The same phenomenon can be pointed out in the case where the mirror chip 210 is fixed to a member whose main material has a similar coefficient of thermal expansion to that of the main material of the elastic members 216 of the mirror chip 210.

In the present embodiment, the metallic main board 232, which is mainly formed of the same material as the base 230 of the mirror chip 210, has a larger coefficient of thermal expansion than that of the elastic members 216 of the mirror chip 210, which is mainly formed of silicon.

When the ambient temperature increases, the main board 232 expands more greatly than the mirror chip 210, the gaps of the support member 212 of the mirror chip 210 expand more greatly than the elastic members 216, and the elastic members 216 undergo tensile stress. As a result, a decrease in the resonance frequency of the mirror chip 210 can be suppressed in comparison with the ordinary case (i.e., the case where no stress is generated).

Conversely, when the ambient temperature decreases, the main board 232 shrinks more than the elastic members 216, the gaps of the support member 212 of the mirror chip 210 become narrower than the elastic members 216, and the elastic members 216 undergo compression stress. As a result, an increase in the resonance frequency of the mirror chip 210 can be suppressed in comparison with the ordinary case (i.e., the case where no stress is generated).

As can be understood from the above, in a scan of a light beam with a resonance frequency, the frequency hardly varies despite the changes in the ambient temperature, without providing an additional member, and increasing the cost and the apparatus size.

The position at which the base 230 and the magnetic circuit 260 are fixed together and the position at which the optical deflector 200 is fixed to an external apparatus are determined in such a manner as not to prevent the base 230 from expanding or shrinking in accordance with variations in the ambient temperature. To be more specific, the positions are sufficiently away from the fixing position between the mirror chip 210 and the base 230, with respect to the direction orthogonal to the longitudinal direction of the elastic members 216 of the mirror chip 210.

The structures in the present embodiment can be modified or altered in various manners.

For example, the optical deflector may be provided with detecting elements for detecting a velocity and an angle. In the case of an electromagnetic driving type, the optical deflector may comprise a detection coil and a hall element that are formed on the movable plate. Without reference to the driving type, the optical deflector may comprise a piezo-resistive element formed on an elastic member, or an electrostatic capacity-detecting electrode formed on the movable plate or elastic members. The optical deflector comprising such a detecting element has additional wire bonding spots, but this does not make the wire bonding step harder to perform.

The above embodiments were described, referring to the case where a vibrator that is twisted or vibrated is applied to an optical deflector. The manner in which the vibrator of the present invention is embodied and the manner in which it is applied are not limited to those described above. For example, the vibrator similar to that of the above embodiment may be applied to an angular speed sensor. In addition, the vibrator of the same structure as the above embodiment may be made to vibrate in a translational manner not in a twisting manner. The vibrator vibrating in this manner may be applied to an acceleration sensor or a translational-motion actuator.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vibrator comprising:
   a vibrating member including a pair of support members, a movable plate capable of vibrating with respect to the support members, and a pair of elastic members connecting the support members and the movable plate; and
   a fixing member holding the support members of the vibrating member, the fixing member being mainly constituted by a material that has a larger coefficient of thermal expansion than that of a material mainly constituting the elastic members of the vibrating member;
   wherein the fixing member is mainly formed of a metallic material, and the elastic members are mainly formed of silicon or a compound thereof.

2. A vibrator according to claim 1, wherein the vibrating member and the fixing member are fixed by use of and adhesive material that cures at room temperature.

3. A vibrator according to claim 1, wherein the fixing member includes a portion fixed to another member, the portion being located away from a fixing position where the vibrating member and the fixing member are fixed together.

4. A vibrator according to claim 1, wherein the fixing member includes a portion fixed to another member, the portion being located away from the fixing position where the vibrating member and the fixing member are fixed together, in a direction parallel to surface of the moveable plate and orthogonal to a longitudinal direction of the elastic members.

5. A vibrator comprising:
   a vibrating member including a pair of support members, a movable plate capable of vibrating with respect to support members, and a pair of elastic members connecting the support members and the movable plate; and
   a fixing member holding the support members of the vibrating member, the fixing member being mainly constituting by a material that has a larger coefficient of thermal expansion than that of a material mainly constituting the elastic members of the vibrating member;
   wherein the vibrating member further includes an electrical conductive member, the fixing member further includes other electrical conductive members, the vibrator further comprises wire elements, which electrically connect the electrical conductive member of the vibrating member and the electrical conductive members of the fixing member, and the wire elements are sealed with a sealing agent that cures at room temperature.

6. A vibrator-manufacturing method comprising:
   forming a vibrating member by use mainly of a first material, the vibrating member integrally including a frame-like support member, a movable plate capable of vibrating with respect to the support member, and a pair of elastic members connecting the support and vibrating members together;
   forming a fixing member by use mainly of a second material, the second material having a larger coefficient of thermal expansion than that of the first material;
   fixing the support member of the vibrating member to the fixing member at room temperature; and
   dividing the frame-like support member into two pieces;
   wherein forming the vibrating member includes forming an electrical conductive member, forming the fixing member includes forming other electrical conductive members, and the method further comprises:
   electrically connecting the electrical conductive member of the vibrating member and the electrical conductive members of the fixing member together by use of wire elements; and
   sealing wire elements at room temperature.

7. A method according to claim 6, wherein the support member of the vibrating member is fixed to the fixing member at room temperature by use of an adhesive that cures at room temperature.

8. A method according to claim 6, wherein the wire elelments are sealed are sealed at room temperature by use of a sealing agent that cures at room temperature.

* * * * *